US008015584B2

(12) United States Patent
Breen et al.

(10) Patent No.: US 8,015,584 B2
(45) Date of Patent: Sep. 6, 2011

(54) DELIVERING INTERACTIVE CONTENT TO A REMOTE SUBSCRIBER

(75) Inventors: George Edward Breen, Wyncote, PA (US); Stephen Jay Kraiman, Warrington, PA (US); Travis Randall Parchman, Philadelphia, PA (US); Jason Lee Weiler, Lansdale, PA (US); Philip John Stroffolino, Prospect Park, PA (US); Peng Chen, Doylestown, PA (US)

(73) Assignee: Seachange International, Inc., Acton, MA (US)

( * ) Notice: Subject to any disclaimer, the term of this patent is extended or adjusted under 35 U.S.C. 154(b) by 1615 days.

(21) Appl. No.: 10/273,527

(22) Filed: Oct. 18, 2002

(65) Prior Publication Data

US 2004/0078822 A1    Apr. 22, 2004

(51) Int. Cl.
*H04N 7/173* (2011.01)
(52) U.S. Cl. .............. 725/86; 725/88; 725/89; 725/90
(58) Field of Classification Search ............ 725/98, 725/86–90
See application file for complete search history.

(56) References Cited

U.S. PATENT DOCUMENTS

| | | | |
|---|---|---|---|
| 5,745,643 A | 4/1998 | Mishina | 386/106 |
| 5,929,857 A | 7/1999 | Dinallo et al. | 345/354 |
| 6,133,920 A | 10/2000 | deCarmo et al. | 345/354 |
| 6,138,175 A | 10/2000 | deCarmo | 710/5 |
| 6,256,730 B1 | 7/2001 | deCarmo | 712/245 |
| 6,341,375 B1 * | 1/2002 | Watkins | 725/100 |
| 6,690,391 B1 * | 2/2004 | Proehl et al. | 715/720 |
| 6,850,284 B2 * | 2/2005 | Gries et al. | 348/512 |
| 7,100,191 B1 * | 8/2006 | Goldberg et al. | 725/110 |
| 7,116,894 B1 * | 10/2006 | Chatterton | 386/211 |
| 7,769,275 B2 * | 8/2010 | Seo et al. | 386/334 |
| 2001/0013123 A1 * | 8/2001 | Freeman et al. | 725/34 |
| 2001/0023436 A1 * | 9/2001 | Srinivasan et al. | 709/219 |
| 2002/0025135 A1 | 2/2002 | Ando et al. | 386/52 |
| 2002/0025143 A1 | 2/2002 | Kashiwagi et al. | 386/126 |
| 2002/0056118 A1 * | 5/2002 | Hunter et al. | 725/87 |
| 2002/0138852 A1 | 9/2002 | Reynolds et al. | |
| 2003/0043924 A1 * | 3/2003 | Haddad et al. | 375/240.28 |
| 2003/0180032 A1 * | 9/2003 | Barde et al. | 386/55 |
| 2005/0076304 A1 * | 4/2005 | Shing | 715/716 |
| 2005/0154988 A1 * | 7/2005 | Proehl et al. | 715/720 |
| 2006/0064728 A1 * | 3/2006 | Son et al. | 725/86 |

FOREIGN PATENT DOCUMENTS

WO  WO0043899 A1  7/2000
WO  WO0201880 A1  1/2002

* cited by examiner

*Primary Examiner* — Pankaj Kumar
*Assistant Examiner* — Mulugeta Mengesha
(74) *Attorney, Agent, or Firm* — Proskauer Rose LLP

(57) ABSTRACT

A method for interactive delivery of multimedia content includes accepting interactive multimedia content encoded in a multiplexed data stream, the stream includes segments that at least some include control data for presentation of the content. The method also includes receiving requests from one or more terminals, at least some of the requests identifies particular segments of the multiplexed data stream, and transmitting identified segments of the multiplexed data stream to the terminals in response to the received requests.

29 Claims, 10 Drawing Sheets

US 8,015,584 B2

DELIVERING INTERACTIVE CONTENT TO A REMOTE SUBSCRIBER

TECHNICAL FIELD

This application relates to a system for delivering interactive content derived from a digital versatile disc to a remote site subscriber.

BACKGROUND

Today, television viewers can view programs from a variety of sources. Two of such sources are home digital versatile disk (DVD) players and cable systems that provide video-on-demand capabilities.

A DVD player retrieves multimedia content (e.g., movies, interviews, etc) from an optical disk and generates audio and video signals for display on a television set connected to the player. The DVD disk includes not only encodings of audio and video signals, but also includes data that is used to configure a user interface presented by the DVD player through which the viewer accesses information on the disk and selects audio/video programming and other content for display on the television set. For example, prior to viewing a movie stored on a DVD, the player typically displays a menu to the viewer showing a catalog of the contents stored on the DVD along with different options and selections for viewing the content. For example, the first menu may list the movie stored on the DVD with alternate endings along with a list of interviews of people associated with the movie. The menus may be nested requiring navigation through multiple menus before audio/video content is displayed. During the viewing of the content of a particular DVD, a viewer controls the operation of the DVD player, for example, from a remote control or from the front panel of the DVD player. In controlling the DVD player, the viewer may pause the content being viewed at a particular scene, jump forward to resume viewing at particular frame in the content, or jump back to resume viewing at an earlier location in the content. Some DVD players support features such as stopping presentation of audio/video content at a particular point and then resuming the presentation at that point at some later time.

Referring to FIG. 1, a typical DVD player 10 reads information from a removable disk 12 using a drive 26 which accesses selected portions of the disk (e.g., sectors) to allow the player to retrieve and process contents stored on the disk and transmit the processed content to a television set (not shown) that is connected directly to the DVD player for presentation to a viewer. A disk reader 21 controls the drive 26 and receives raw data from the drive. A controller 23 controls which portions of the disk are retrieved by the reader 21. The disk reader 23 performs some initial processing of the data read from the disk, including decryption of the data. The resulting data stream is passed by the reader 21 to a content decoder 25, which processes the data stream to form signals suitable for the television set.

To operate the DVD player 10, a viewer inserts the disk 12 into the drive 26 of DVD player. The controller 23 instructs the reader 21 to retrieve a predetermined portion of the disk. On most commercially available disks, initial playing of this portion of the disk causes a menu to be displayed on the television. In response to the displayed menu a user can enter a command, such as "play", into a front panel 16 of the DVD player 10 or by a remote control 18. After the viewer enters the command, controller 23 decodes the command and determines what portion of the disk 12 should be retrieved next, and instructs disk reader 21 correspondingly. For example, if the user enters a "play" command, the controller 23 sends a control signal identifying the start of the program to play to the disk reader 21, which begins retrieving the program and streaming the data encoding the program to the content decoder 25. If the viewer enters another command, such as "menu", "stop", "step forward", or "step back," controller 23 sends the appropriate control signals to the disk reader 21 in order to access the information in response to executing the viewer's command.

The information that is received by the content decoder 25 from the disk reader 21 typically includes a mixture of video, audio, navigation, highlight, and subpicture data. In general, the video data is encapsulated in MPEG (Moving Picture Experts Group) format and may have been recorded in the National Television Systems Committee (NTSC) standard that has a video line resolution of 525 lines and is used as the television standard for North America and Japan or recorded in another format such as the PAL (phase alternation line) or SECAM (Sequential Couleur A Memoire) format which are used extensively in Europe. Digital audio data is stored on the DVD 12 in linear pulse code modulation (LPCM), Dolby Digital audio, MPEG audio, or another similar format for encoding audio data and is decoded prior to sending the audio to the television set or its associated audio system. In general, navigation data describes the characteristics of the video and audio encoded on the disk 12, the locations of the different titles on the disk, the streaming sequence of the different titles and portions of the titles, and the commands that execute at particular locations in the video stream. In general, subpicture data includes encodings of graphical images that include subtitles and menus that are overlaid on a video still image or a video sequence. The subpicture data provides the graphical portion of a menu and usually includes text, graphics, and graphic images such as interactive buttons for a viewer to select menu options. The subpicture data also includes navigation information that contains a highlight construct that controls when and how to change the colors on a portion of a subpicture (e.g., a button) so that when a viewer presses a key on the remote control 18, the DVD player removes and applies highlights to the appropriate button or region of the menu. Also, after the viewer makes a menu selection, by pressing a button on the remote control 18, the DVD player 10 executes a command associated with the highlighted button associated with actions that should be performed in response to the particular button pressed by the viewer. For example, upon the viewer making a selection the navigation information identifies the next portion of the disk that should be played in response to the selection, such as selecting the "play" command. Also, the subpicture data includes navigation information that is used to chain portions of the disk to form a continuous presentation to the user.

As another source of television content, cable television systems provide viewers with hundreds of broadcast channels that include video and audio services. Some of these systems also support video on demand (VOD) programming that is sent to particular subscribers and in which the user has sequential control over the presentation of the video, for example, enabling the user to pause, fast-forward, or rewind the on-demand program.

SUMMARY

The proliferation of DVD technology, and in particular DVD players, has provided viewers with a large amount of video content such as movies, recorded television programs, and sporting events for viewing. Using interface data stored on the DVD media, DVD players also allow viewers nearly instantaneous access to particular locations of a video and the ability to control the playing of the content. DVDs typically contain extra information beyond particular content such as a movie, for example, interviews with actors in the movie and alternate movie ending may also be included for viewing. Viewers have come to expect the type of interface provided by a DVD player ("the DVD experience") and the functionality provided by that interface. On the other hand, cable television based video-on-demand systems typically provide a much more rudimentary interface that enables sequential control of the presentation of a program, such as pause, fast-forward, and rewind commands. By providing multiple viewers access to a centralized instance of the DVD content or interactive content that is typically produced for storing on a DVD, each viewer can receive "the DVD experience" from the centralized instance over a VOD system.

In a general aspect of the invention, a television system provides an interface, which enables some or all of the features of a "DVD experience," to viewers over the television system without using a DVD player at the viewer's premises. Multimedia information, such as information that actually was or is typically stored on a DVD disk, is preprocessed and stored in the television system remote from the user premises, for example at the head end of the system. One or more viewers can access the information using set-top boxes at the users premises. The set-top boxes interact with other equipment in the television system to implement the interface, which may provide a DVD-like experience to the viewer.

By splitting the functionality of a typical DVD player between the viewer residence and the cable head end, storage of the video content can be at a central location and access to the content may only be allowed to subscribers to the cable system similar to video-on-demand (VOD) programming.

In one aspect, in general, the invention features a method for interactive delivery of multimedia content. The method includes accepting interactive multimedia content encoded in a multiplexed data stream. The stream including segments at least some of which include control data for presentation of the content. The method also includes receiving requests from one or more terminals, at least some of the requests identifying particular segments of the multiplexed data stream, and transmitting identified segments of the multiplexed data stream to the terminals in response to the received requests.

The approach can include one or more of the following features:

A first segment of the multiplexed data stream may be received at one of the terminals, and control data may be multiplexed in the received segment.

The received control data may include data characterizing interactive characteristics multiplexed in the segment, and a user interaction using the received data may be controlled.

A request for a second segment of the multiplexed data stream may be transmitted according to the user interaction, and the second segment in response to the transmitted request may be received.

The user interaction may be controlled to include presenting selection information to a viewer based on the received data.

The user interaction may be controlled to include accepting a selection from the viewer.

The received data may include instructions, and the user interaction may be controlled to include executing the instructions.

A request for a second segment of the multiplexed data stream may be transmitted according to the control data in the first segment, and the second segment may be received in response to the transmitted request.

The control data in the first segment may include an identification of the second segment.

More than one terminal may request the same data stream.

The interactive characteristics of the content may include a menu.

The transmitting of the segments may include controlling the transmission according to information included in the data stream.

Controlling of the transmission may include stopping the transmission.

Controlling of the transmission may include one segment identifying another segment for transmission.

Accepting of the interactive multimedia content may include encoding the content into the multiplexed data stream.

Data may be accepted representing the interactive multimedia content, and encoding the content may include processing the accepted data.

Accepting the data representing the interactive multimedia content may include accepting the data from a digital versatile disk (DVD).

Encoding the multiplexed data stream may include, for some of the segments of the multimedia stream, combining data and video presentation information accepted from the DVD to form the segment.

Encoding the multiplexed data stream may include converting a format of presentation information accepted from the DVD.

Converting the format of presentation information may include converting the format of video information.

Converting the format of presentation information may include converting the format of audio information.

Converting the format of presentation information may include converting the format of control data.

The encoded data stream may be stored prior to receiving the requests from the one or more terminals.

Storing the encoded data stream may include storing the stream remotely from the one or more terminals.

Each of the terminals may be located at a viewer's location.

Encoding the multiplexed data stream may include encoding a continuous data stream for the content.

Some of the segments may include repeated video content.

Some of the segments may include repeated video content at the end of the segments.

The segments of the multiplexed data stream each may include a different time segment of the data stream.

Receiving the requests identifying particular segments may include receiving requests identifying particular times associated with the data stream.

Encoding the multiplexed data stream may include encoding the data stream for transmission over a television distribution system.

Encoding the data stream for transmission over a television distribution system may include encoding the data stream for transmission over a cable television network.

Encoding the data stream for transmission over a television distribution system may include encoding the data stream for transmission over a two-way internet protocol.

Accepting the multiplexed data stream may include accepting an MPEG stream.

Accepting the MPEG stream may include accepting an MPEG transport stream.

The approach may have one or more of the following advantages:

By providing access to a centralized instance interactive television content, multiple viewers can receive a "DVD experience" over a VOD system without using a DVD player at each viewer residence. By integrating DVD content and DVD player functionality into a VOD system, current VOD technology can be utilized to deliver interactive television content to multiple cable subscribers without the subscribers purchasing or renting individual DVDs. By delivering the interactive television content through a VOD infrastructure, content owners are given a new channel to offer their programming content along with producing a revenue stream while assisting content owners in promoting DVD sales and rentals. Also by authoring and storing DVD content on a VOD system, more content can be stored on the VOD system than in a typical DVD disk with 9 Giga bytes of storage capacity.

DESCRIPTION

1 Overview

Figure 2:
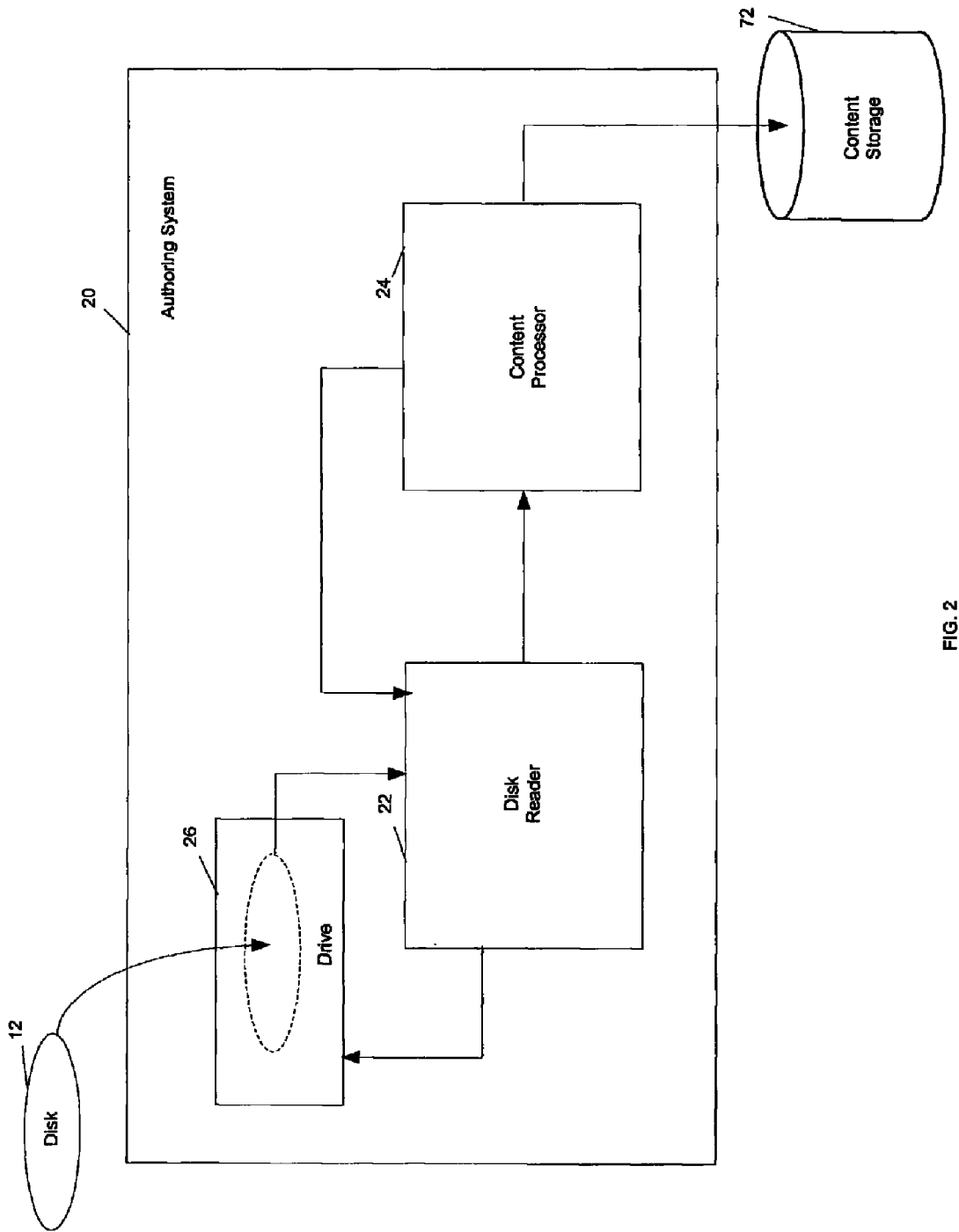
FIGS. 2 and 3 is a block diagram of a cable system with a DVD based storage system.
Figure 3:
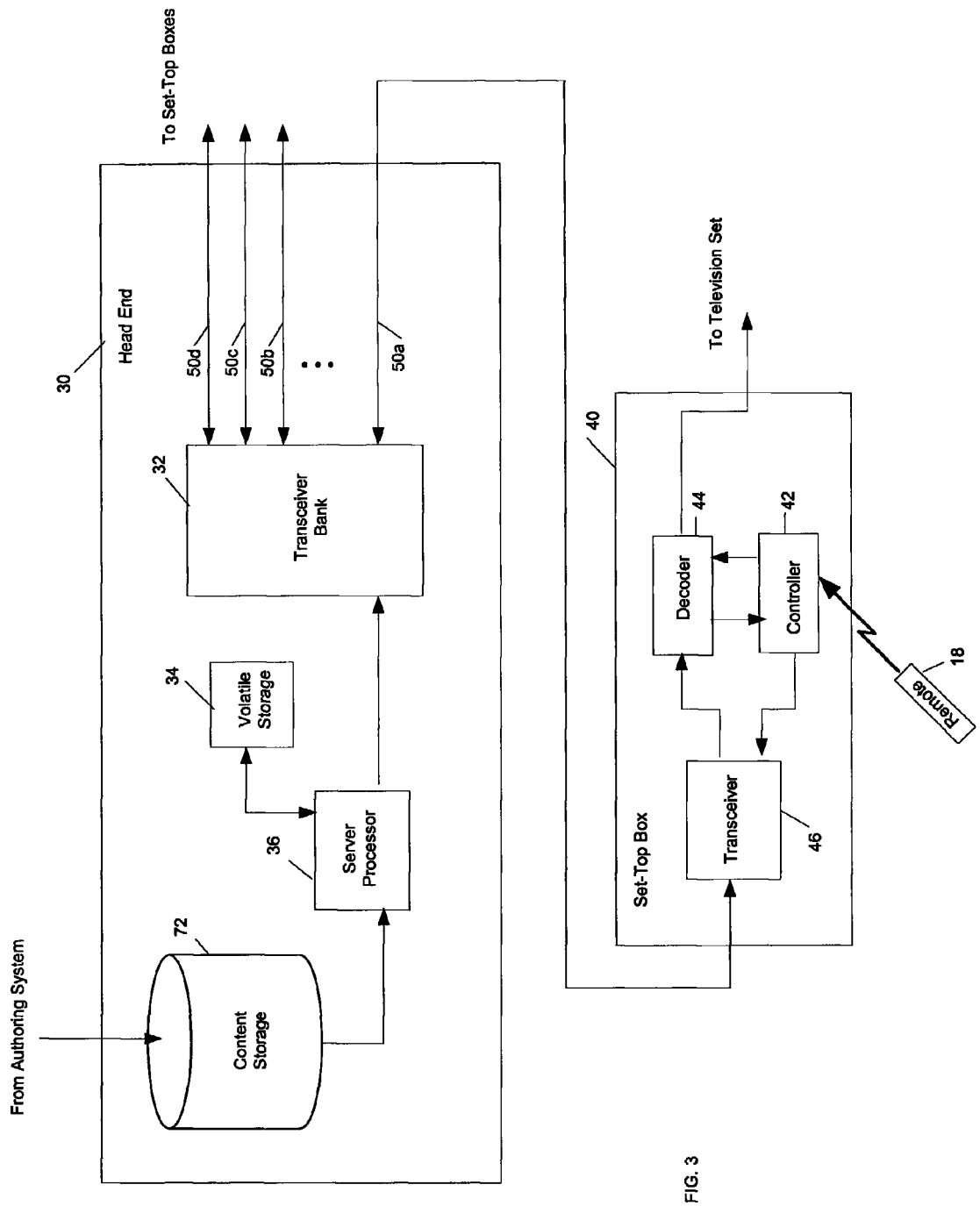

Referring to FIGS. 2 and 3, a television system includes a capability to extract information from a DVD disk 12 for later interactive presentation to users over the television system. Referring to FIG. 2, the television system includes an authoring system 20 that is used to extract and process information on the disk, and to store the processed information in a content storage 72, such as on magnetic disks. Referring to FIG. 3, the system also includes a head-end system 30, which includes the content storage 72 or another copy of the information produced by authoring system 20. The head-end system 30 communicates with a number of remote set-top boxes 40 at locations remote from the head end to provide viewers a capability to interactively view the content that was originally stored on DVD disk 12.

Figure 1:
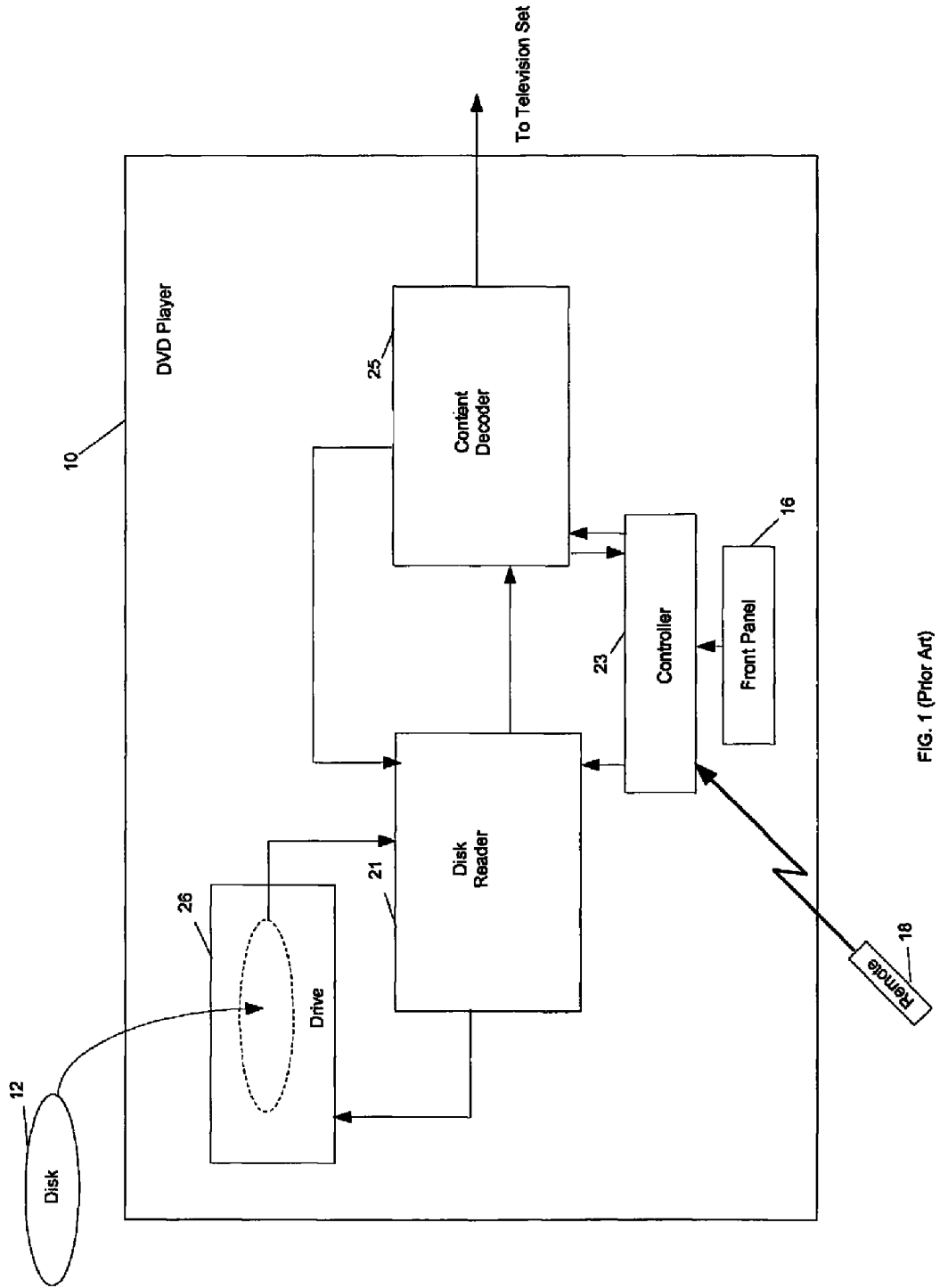
FIG. 1 is a block diagram of a DVD player.

Comparing FIG. 1, which shows the DVD player 10, and FIGS. 2 and 3, some or all of the functionality of the DVD player is distributed among the authoring system 20, the head end 30, and an individual set-top box 40. That is, drive 26 and disk reader 21 of authoring system 20 provide a way of retrieving information stored on a DVD disk 12. The drive 26 and disk reader 21 provide the information to a content processor 24, which processes the information for suitable use in the head-end 30 of the system. In viewing the content that was extracted from the disk 12, a viewer interacts with a controller 42 in set-top box 40, which communicates with a server processor 36 at the head end through a bi-directional communication infrastructure that includes a transceiver bank 32 at the head end 30 and a transceiver 46 at each set-top box. Together, the controller 42 in the set-top box 40 and the server processor 36 control which portions of the information in content storage 72 are passed to the set-top box 40, thereby providing functionality that is similar to that provided by controller 23 of the DVD player 10 (shown in FIG. 1). At the set-top box 40, decoder 44 decodes the information that is passed from content storage 72 to the set-top box for presentation on the viewer's television set (not shown), thereby providing functionality that is similar to that of content decoder 26 of the DVD player shown in FIG. 1.

Returning to FIG. 2, authoring system 20 includes disk reader 22 and content processor 24. Information on a DVD disk 12 is typically encrypted and is decrypted by the disk reader 22 once retrieved from the disk. The information that is passed from the disk reader 22 to the content processor 24 is essentially a decrypted form of the information on the disk, with little additional processing. Content processor 24 processes the decrypted information from the disk 12 and multiplexes the processed information into an "asset" that is made up of one or possibly more MPEG transport streams that are stored in content storage 72.

Referring to FIG. 3, when a viewer wishes to access the asset, for example, to view a movie, the viewer uses the set-top box 40 to communicate a selection of the asset to the cable system head end 30. Server processor 36 retrieves the MPEG transport stream for the selected asset and begins sending that stream to the viewer's set-top box. As part of interactive presentation of the asset, in general, controller 42 in the set-top box 40 requests different portions of the asset in turn by requesting different time portions of the MPEG stream from the server processor 36 at the head end. As part of the authoring process, the MPEG stream is assembled to include data and instructions that are used by the controller in the set-top box to implement interactive features, such as menus, which are used by the controller 42 to present a user interface to the viewer and to request appropriate portions of the asset from the head end 30.

2 Authoring System

Returning to FIG. 2, authoring system 20 processes information stored on DVD disk 12 and can further produce information that complements the information on the DVD disk in order to enhance the viewing experience. Alternatively, the authoring system 20 can produce information that is unrelated to the information stored on the DVD disk 12 and include this unrelated information, or the related complementary information, in an MPEG transport stream 120 (shown in FIG. 2A) that is stored on content storage 72. Referring to FIGS. 2 and 2B, processing of the information is performed in several stages. For example, for information stored on a disk 12, disk reader 22 and content processor 24 extract and decrypt the information 102 on the disk to produce audio/video objects 103 and menu and navigation information 104. Typically the menus and navigation information is stored in disk sectors separate from the sectors that store movie content. MPEG transport stream 126 stored in content storage 72 contains the menu and navigation information multiplexed with the movie and other content. Content processor 24 converts the format and resolution of the audio/video objects 118 to produce a number of MPEG elementary streams 117, and generates control information from the menu and navigation information to produce MPEG elementary data streams. Finally, the content processor 24 combines the elementary streams to form a multiplex MPEG transport stream.

Figure 2A:
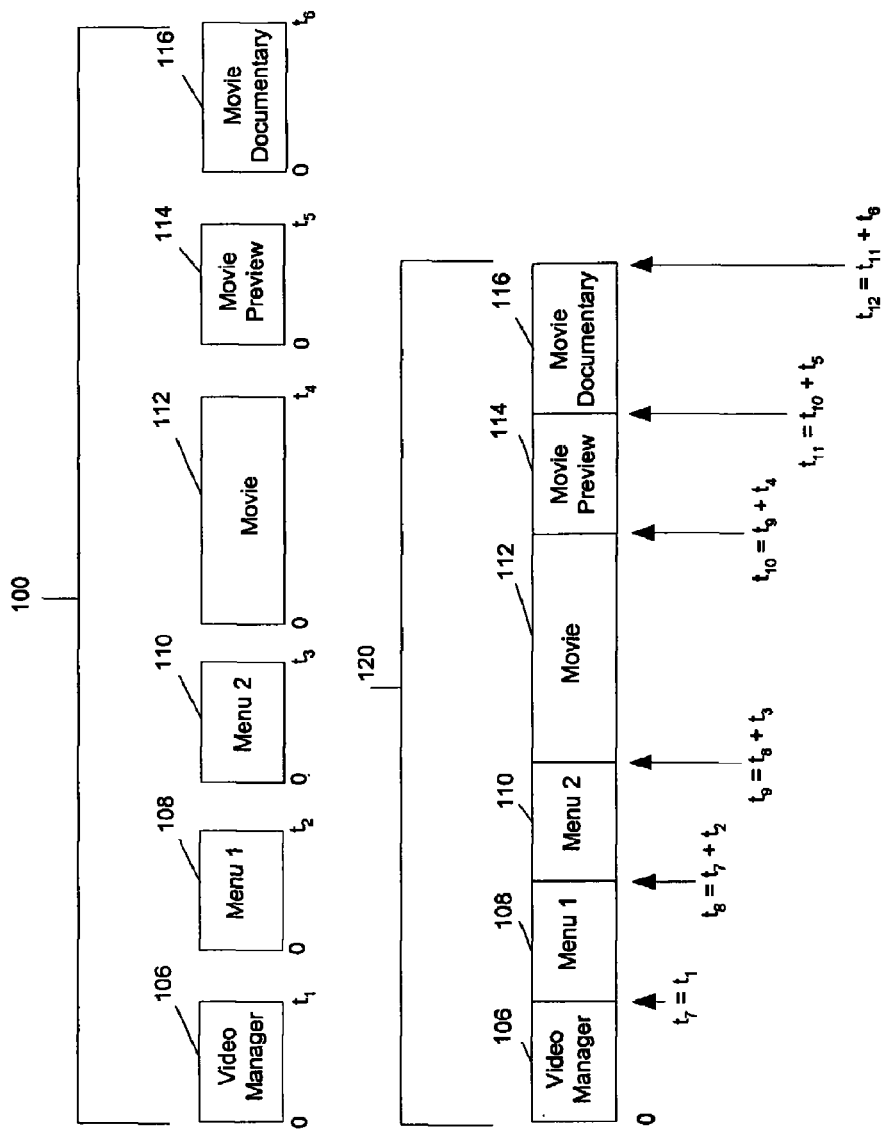
FIG. 2A is a block diagram that illustrates some DVD content.
Figure 2B:
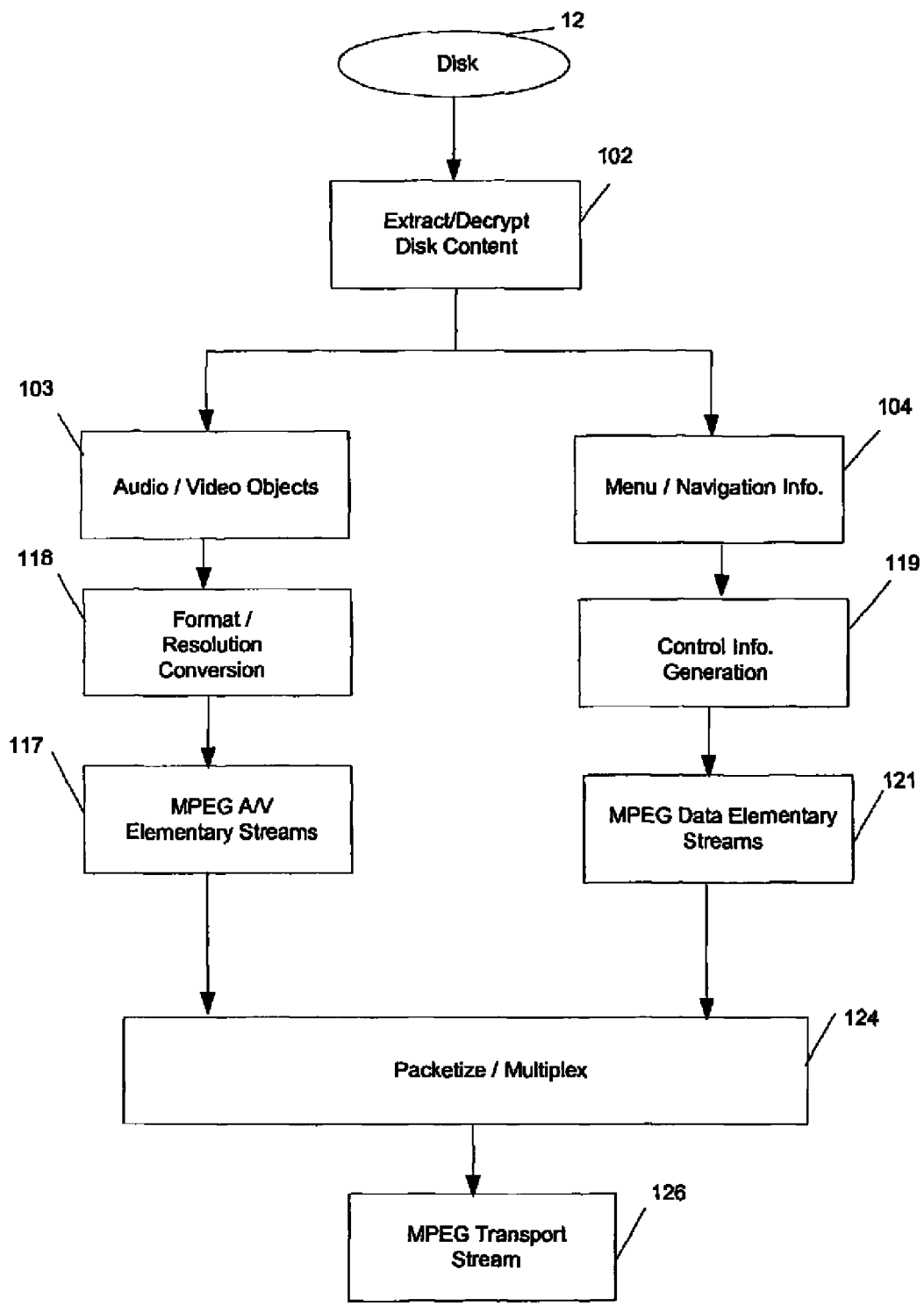
FIG. 2B is a block diagram of some authoring system operations.

Referring to FIG. 2A, content 100 of a typical DVD disk includes a number of separate elements. For example disk contents 100 include a video manager 106 that includes information associated with the disk as a whole. The contents 100 also includes menu information and navigation information (e.g., highlights) for a number of interactive menus, illustrated in this example as a selection menu 1 108 and menu 2 110. These menus allow a viewer to select the content to be viewed. The menus can be presented with a video background. Other elements on the disk store the actual audio-video material, such as a movie 112, a preview 114 of the movie, and a documentary 116 that describes the production of the movie 112.

Each of elements 106-116 can include video, audio, and subpicture data for presenting the associated information to the viewer. Specifically, each of the elements typically includes one Video Object (VOB) that includes audio/video data and optionally subpicture data, such as close captioning or graphics for menus. In addition, each of the elements can include one or more program chains, each of which can include commands that are used to present menus and navigate between different of the elements, as well as information that is used to select particular portions (cells) in sequence of a VOB for presentation. Referring to FIG. 2B, the audio/video objects 103 correspond to the VOBs for the elements, and menu/navigation information 104 corresponds to information in the program chains.

Each of the one or more of the program chains is used to convert and concatenate the audio and video objects associated with that program chain into a number of MPEG audio and video elementary streams 117. Typically DVD content is stored in multiple sectors on the disk and can be individually accessed based on the sector that stores the particular content. However, since all of the audio and video objects 103 along with the menu/navigation information 104 is stored in a single MPEG transport stream 126, for storage on the content storage 72 (shown in FIG. 2), references to particular starting points in the audio and video objects 103 are expressed in terms of normal playing time (NPT) with a common series of times stamps that is assigned to the MPEG transport stream. This time series, which assigns an NPT to each object is relative to the start of the transport stream 126 and provides access to a particular point in the content based on the NPT associated with the particular point in the transport stream.

Also, prior to multiplexing the transport stream 126, the audio and video objects are processed for transmission over a VOD system. For example, Format/Resolution conversion 118 uses the sequence of audio and video objects to produce the elementary streams. Also, by concatenating the elementary streams the transport stream 126 can contain a movie with an alternative ending concatenated onto the end of the movie or the transport stream include the movie without any additional scenes concatenated at a particular point in the movie. Although in general there is one video and one audio stream, multiple audio and multiple video streams can optionally be retained.

Referring to FIGS. 2A and 2B, since a portion of the disk content 100 is eventually transmitted over the cable system to one or more set-top boxes, the transmission bandwidth of the cable system can limit the transmission of the disk contents. Also, while DVD players (such as DVD player 10 shown in FIG. 1) retrieve disk content with variable bit rates, content sent over a cable system is typically transmitted at a constant rate such that the cable system bandwidth is more manageable. For example, to accommodate the limited and constant available bit rate in the television system, format/resolution conversion 118 reduces the high-resolution (720×480 pixels) encoding of the DVD content 100 to a lower video resolution of 352×480 pixels that correspondingly reduces the transmission bit rate and bandwidth for transmitting from the cable head end 30 to the set-top box 40 (shown in FIG. 3). Besides reducing the video portion of the content 100, format/resolution conversion 118 may also reduce the video resolution of the interactive subpicture data included in the disk content 100 before transmission. Also in addition to reducing the resolution of the video content format/resolution conversion 118 may filter the audio portion of the content 100 to adjust the audio bandwidth or encoding format. The result of processing by format/resolution conversion 118 are elementary streams 117 that when multiplexed together are suitable for delivery over the television system to a viewer's set-top box.

Menu and navigation information 104 is processed by control information generator 119 to form data streams that are suitable for processing at the set-top box. This processing includes modification of the format of the encoding of the information, as well as selection of information that will be needed by the set-top box to implement interactive features such as menus.

Packetize/multiplex module 124 packetizes and multiplexes the audio and video elementary streams together with MPEG-2 private data (subpicture, highlights, navigation and timing recovery information, etc.) and concatenates these multiplexed streams. Referring to FIG. 2A, the resulting concatenation of corresponding multiplexed MPEG streams forms one continuous MPEG-2 single program transport stream 120 (SPTS). The packetize/multiplex module 124 (shown in FIG. 2B) also modifies the time stamps (PCR, PTS, and DTS and the timing recovery information) of the streams so that time increments continuously according to the normal play time (NPT) of the stream 120. That is, the entire stream could be received by an MPEG demultiplexer/decoder and the elements of the transport stream presented in sequence. Also by associating the normal play time with the transport stream a viewer can enter a command from a remote control into a set top box so that the contents of the transport stream are presented from a particular point in the movie that corresponds to an NPT in the transport stream.

To associate the NPT with the disk contents, a common time stamp series is assigned to the SPTS 120 such that for each particular time stamp that is assigned to the end of each content portion, the same time stamp is also assigned as the beginning time stamp to the next content portion in the SPTS. As shown in the figure, the portions (with reduced video resolution) are grouped such that the beginning of the video manager 106 is assigned a starting time stamp of 0 and an ending timestamp of $t_7$ that equals the original time length of $t_1$ of the video manager 106. The selection menu 1 108 begins with the time stamp $t_7$ and ends on time stamp $t_8$ that as a value equal to $t_7+t_2$, where $t_2$ is the presentation length of the selection menu 1 106. Correspondingly, option menu 2 110 begins with $t_8$ and end at time stamp $t_9$, the movie 112 begins with time stamp $t_9$ and ends with $t_{10}$, the movie preview 114 begins at timestamp $t_{10}$ and ends at $t_{11}$, and the movie documentary 116 starts at $t_{11}$ and ends at $t_{12}$.

Once packetize/multiplex module 124 has determined the starting playing time of each element, control data in the stream is set so that the start of a particular element, or a sub-portion (e.g., scene) within an element, can be referenced according to the playing time within the overall time-stamped stream. Also in arranging the relative position of the content portions 106-116 in the SPTS 120, subpicture data can be positioned at the front of the SPTS so that when the data is decoded, time latency due to transmission and decoding can be compensated.

Timing signals can also be multiplexed in the SPTS 120. For example, since video and audio content is typically decoded by the set top box 40 by hardware and software is typically used to decode the interactive subpicture content, timing delays develop between the two decoding paths. To correct these and other timing delays, timing information is embedded in the stream to create a virtual program clock reference (PCR) at the set top box 40 to synchronize the video and audio content with the interactive subpicture content. An approach to use of such timing information is described in co-pending application Ser. No. 10/273,525, filed Oct. 18, 2002.

In other examples the authoring system 20 can multiplex the content 100 of the DVD disk 12 into two or more SPTS streams for more efficient storage and management of the content. After multiplexing 124 (shown in FIG. 2B) the SPTS 120 from the content 100 and other associated information (e.g., timing information), the authoring system 20 (shown in FIG. 2) stores 126 (shown in FIG. 2B) the transport stream 120 in the content storage 72 (shown in FIG. 2) for quick access by the head end 30.

3 Head-End System

Referring to FIG. 3, after the contents from the DVD disk 12 (shown in FIG. 2), along with the contents from other DVDs have been processed and stored in the content storage 72, the head end 30 can retrieve individual SPTSs from the storage based on a viewer request received from the set top box 40 over cable line 50*a*. Other viewers may also subscribe to the services of the head end 30 and send requests over respective cable lines 50*b*, 50*c*, 50*d* from other set top boxes (not shown) located at each viewer residence. Each viewer can request that particular content from a particular DVD, whose content was stored in the content storage 72, be transmitted from the head end 30 to the viewer's set top box. The viewer may also send DVD-like commands to the head end 30 so that the transmitting content is "paused", "fast forwarded", "rewound" or altered similar to other DVD commands. In order to execute these commands, which are received by the particular transceiver, located in transceiver bank 32, from the requesting set top box, the server processor 36 may store portions of the requested content in a volatile memory 34 so the processor can quickly access the content for processing and transmitting to the one or more set top boxes. For example, to pause, fast-forward, or rewind the content retrieved from the content storage 72, a portion of the content may be placed in the volatile storage 34 so that the processor 36 can quickly apply the received command to the content portion.

Operation of the head end 30 does not necessarily have to be modified to deliver the MPEG stream that encodes the information from the DVD. When a viewer requests a particular asset, the head end system 30 begins streaming the corresponding MPEG stream from its starting point. In this case, the beginning of the stream includes menu data that will be received by the set-top box. If the head end 30 were not to receive commands to play particular time portions of the stream, all the elements would play continuously in sequence. However, in some arrangements commands can be stored in Meta data separately from the MPEG stream so that the head end 30 detects and executes the commands prior to continuing the transmission. For example, the head end 30 may detect a command in the MPEG stream such that as transmission of one portion of the stream is completed, the head end jumps to a different portion of the stream (identified by an NPT marker) and continues the transmission from this new position in the stream. But if the head end 30 is not assisting the set top boxes, as described below, the set-top box interprets the menu data that it receives, and based on that data, sends commands to the head end including commands to pause the stream, for example, in order to avoid streaming continuously from one element to the next, or to restart at a particular time, which corresponds to a start of an element in the concatenated stream or to the start of a particular portion of an element (e.g., a scene) within one of the elements.

4 Set-Top Box

Referring to FIG. 3, the set top box 40 receives the MPEG stream from the head end at a transceiver 46 and passes audio and video streams to decoder 44 for presentation on the viewer's television. The set-top box also includes a controller 42 that receives the DVD-like commands from the viewer either from a remote 18 or from a front panel (not shown) in a similar fashion to the DVD player 10 shown in FIG. 1. Some commands such as "pause", "fast forward", and "rewind" are sent to a transceiver 46 for transmission to the head end 30 for processing. However, other commands received by the controller 42 from the viewer may be processed locally at the set top box 40.

Commands scripts (or programs) that are downloaded by the set top box 40 when first powered on or that are permanently resident in the set-top box are executed by the controller 42. In some arrangements the command scripts may be downloaded when the set top box is tuned to a particular channel or by some other similar operation. These scripts are used to interpret data received from the head end and to control the presentation of the content according to the received data. When encoded DVD content is received by the set-top box 40, data in the stream used to control the presentation is passed to controller 42. For example, initially, navigation data is passed to the controller, which is used to control presentation of an initial menu. This control information also includes information that causes the controller to send commands to the head end. For example, if an element in the stream is near its end, the controller is instructed to send a "pause" command to the head end, or to restart the element from the beginning and prevent the stream from automatically passing into the next element in the SPTS. As mentioned, in some arrangements, the head end 30 can detect the end of an element and jump the transmission back to the NPT corresponding to the start of the element to prevent transmitting the next element in the SPTS. The controller 42 also receives commands from the user, which are either used locally to affect the presentation of menus, or are used by the controller to send appropriate commands to the head end 30 to affect what part of the stream is sent from the head end to the set-top box.

5 Operation 5.1 Initiating Delivery

Figure 4:
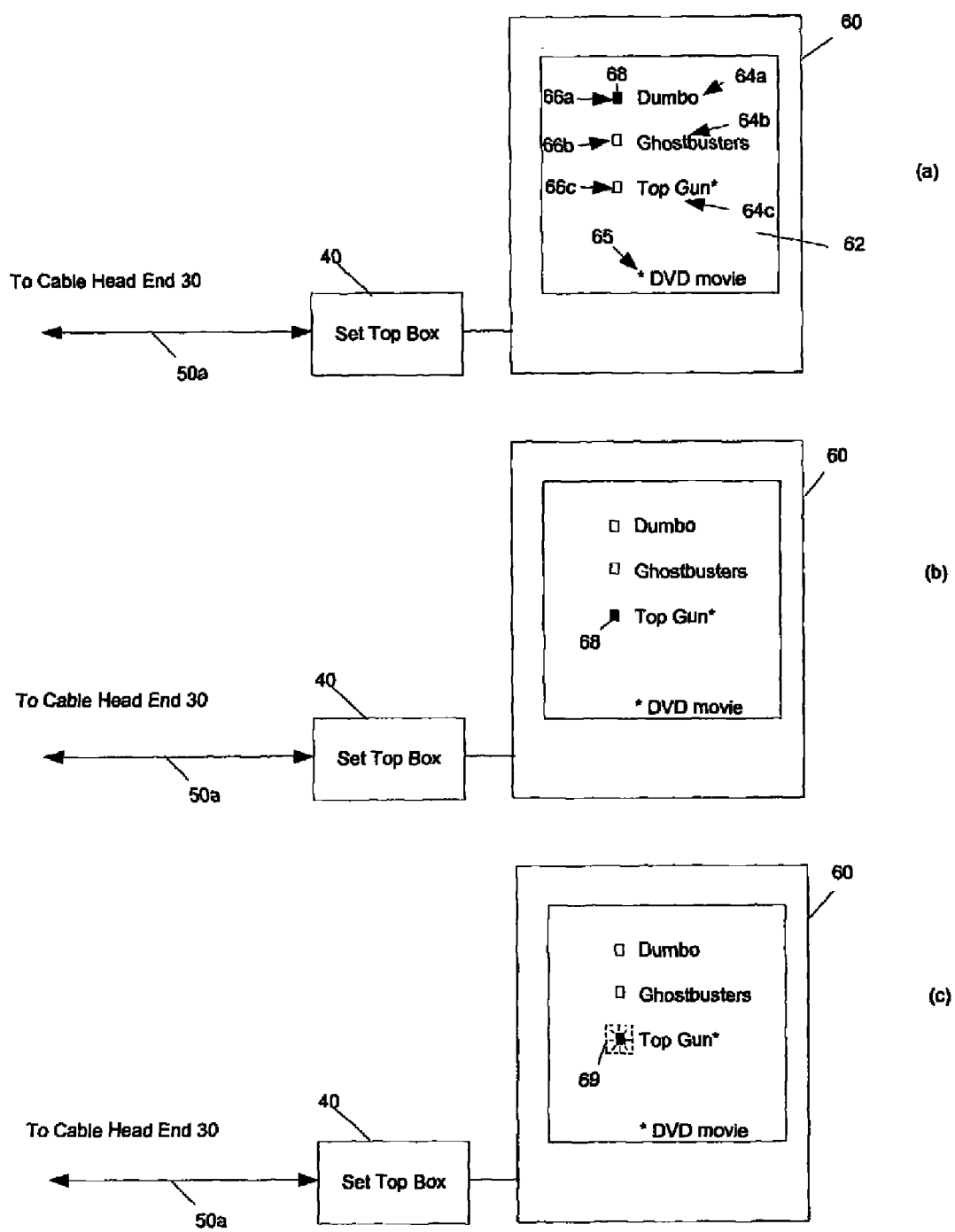
FIGS. 4(a)-(c) is a series of block diagrams representing a set-top box and a television presenting a selection of movies.

Referring to FIGS. 4(*a-c*), a television 60 and the set top box 40 are displayed in a series of three figures to demonstrate the typical viewer experience of retrieving DVD content that is stored at the cable system head end 30 (shown in FIG. 3). Referring to FIG. 4(*a*) the television 60 and set top box 40 are activated by the viewer either by the remote 18 (shown in FIG. 3) or by interacting with a front panel on each item. Upon activating the television and set-top box 40, a request is sent over the cable line 50*a* from the set top box to the cable head end 30 for down loading menu control scripts on to the set top box. After receiving the request, the cable head end 30 transmits over the cable line 50*a* the requested menu control scripts. When executed these control scripts can, for example, allow the viewer to select a portion of a menu that is being displayed on the television along with providing the viewer with the capability to move a selection indicator to other possible menu selections. Once these scripts are downloaded on to the set top box 30, the viewer can have a selection guide, typical to a video-on demand (VOD) service, displayed by selecting a particular menu key on a remote control (not shown) or by tuning the television to a particular broadcast channel. This selection guide provides a list of the movies that can be retrieved from the cable head end 30. For example, as shown in the figure, a selection guide 62 is presented on the television 60 that includes a selection of three movies 64a-c along with selection indicators 66a-c so the viewer can alter his or her movie selection. The set top box also executes a menu control script to position a highlight box 68 in the selection indicator 66a of the first movie listing 64a. Also, in this particular example, the third movie 64c ("Top Gun") is denoted with an asterisk 65 to alert the viewer that this particular movie selection includes extra content that was stored from a DVD disk 12 (shown in FIG. 2). In some arrangements the asterisk 65 can signify that the selection includes extra content that was produced by the authoring system 20 (shown in FIG. 2) and may or may not include content from the DVD disk 12 (also shown in FIG. 2). The other selections 64a, 64b offered to the viewer may have been recorded from videotape and do not contain the extra DVD content that is associated with the third selection 64c.

Referring to FIG. 4(b), once the selections 64a-c are presented to the viewer, the viewer can use the television remote control 18 (not shown) to move the highlighting box 68, or other similar pointing representation, to another selection that is of interest to the viewer. Typically to move the highlighting box 66, the viewer enters one or more commands into the remote control 18 (e.g., up and down arrow keys) that are associated with moving the position of the highlighting box 68. After the respective up or down arrows have been pressed, typically a wireless signal is sent to the set top box 40 which determines if the command can be executed locally at the set top box 40 or transmitted to the cable head end 30 for remote execution. In this particular example, the movement of the highlight box 68 can be executed by a control script that was downloaded by the set top box 40. As shown in the figure, the highlight box 68 has changed position to the lowest movie selection 66c ("Top Gun") by the viewer pressing the down arrow on the remote control 18 twice.

Referring to FIG. 4(c) after the set top box has executed the control scripts to place the highlight box 68 in the selection indicator 66c associated with the movie of interest, the viewer can press a selector button on the remote control to select this particular movie that contains DVD content. After the selection command is received by the set top box 40, the set top box determines that two commands must be executed based on this viewer selection. For the first command, a control script is executed locally at the set top box 40 to display a flash 69, or another similar attention grabbing graphic to alert the use that a movie selection has been made. The second command associated with the viewer movie selection is processed at the head end 30 and a signal is transmitted over the cable line 50a from the set top box 40 to the cable head end 30 to inform the head end of the viewer selection. Upon receiving the selection command from the set top box 40, the head end 30 retrieves the content that would be shown to the viewer if the movie were being viewed from a DVD on a DVD player at the viewer's location. In this particular example, the next content shown to the viewer is a menu that contains a list of the DVD content.

5.2 Processing DVD Content

Referring to FIG. 3, once the viewer has requested the DVD content, and the head-end 30 has begun streaming the corresponding MPEG stream to the set-top box 40, the controller 42 in the set-top box receives data that it uses to present selection menus to the viewer.

Figure 5:
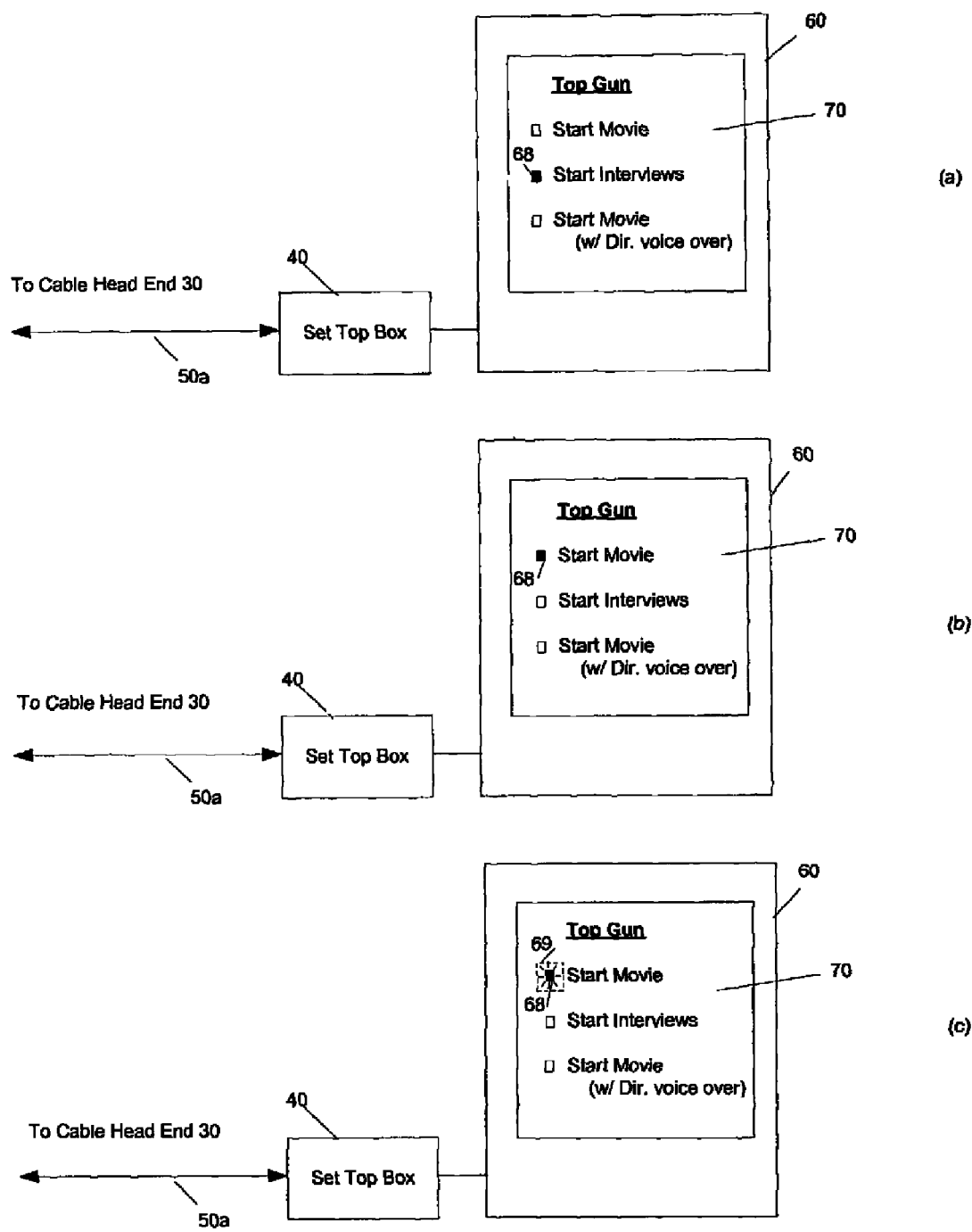
FIGS. 5(a)-(c) is a series of block diagrams representing a set-top box and a television presenting a selection of movie options.

Referring to FIG. 5(a), the controller can, for example, receive the initial navigation data that it uses to locally generate the DVD menu 70 associated with the movie ("Top Gun") selected in FIG. 4(c) that has been retrieved from the content storage 72 (shown in FIG. 3) and transmitted from the head end 30 to the set top box 40 from which the movie was selected. Similar to the previous menu, the DVD content menu 70 contains three selections for the viewer to choose from. This menu is generated locally based on the received data, and may be presented as an overlay over moving pictures encoded in the audio/video portions of the MPEG stream. Also similar to the previous menu the user can use the remote control 18 (not shown) to selectively highlight each of the provided selections. In this particular example the viewer moves the highlight box 68 from the "Start Interviews" choice to the "Start Movie" selection as shown in FIG. 5(b). Similar to the command executed for changing a highlighted selection indicator in FIG. 4, the highlight command is executed locally on the set top box 40 and the "Start Movie" selection indicator is shown highlighted to the viewer. In this particular example the viewer is interested in only viewing the movie and not viewing any interviews nor viewing the movie with a voice-over description by the movie director. So, in this case the viewer presses the selection button on the remote control 18 to transmit a signal to the set box 40 and correspondingly execute a control script on the set top box 40 to display the flashing graphic 69 on the television screen as shown in FIG. 5(c). The set top box 40 also transmits a signal over the cable line 50a to the cable head end 30 so the content associated with the viewer selection is transmitted from the appropriate position in the SPTS based on the particular NPT that is associated with the particular selected content. Once the appropriate portion of the SPTS is retrieved content storage 72 (shown in FIG. 3), the head end 30 (also shown in FIG. 3) transmits the retrieved content to the requesting set top box 40.

Often a viewer may study the menu 70 selections of the DVD content associated with a particular movie beyond the run time length of the video stream that contains the video content of the menu. In order to continue presentation to the viewer, the controller 42 (shown in FIG. 3) at the set-top box 40 sends a "pause" command to the head end to freeze the audio/video signal. This results in continued transmission of a dynamically generated MPEG stream from the head end 30 that encodes a still picture rather than the stored MPEG stream. Alternatively, the controller 42 sends commands that cause the element to be repeatedly presented in an "infinite" loop. Also, as mentioned, in some arrangements the head end 30 (shown in FIG. 3) can detect the end of the menu run time and jump back to the NPT that corresponds to the beginning of the menu so that the menu is retransmitted to the set-top box. Also, in some arrangements the set top box 40 has the television repeat presenting the last video frame decoded until the set top box receives more video data from the head end 30.

Figure 6:
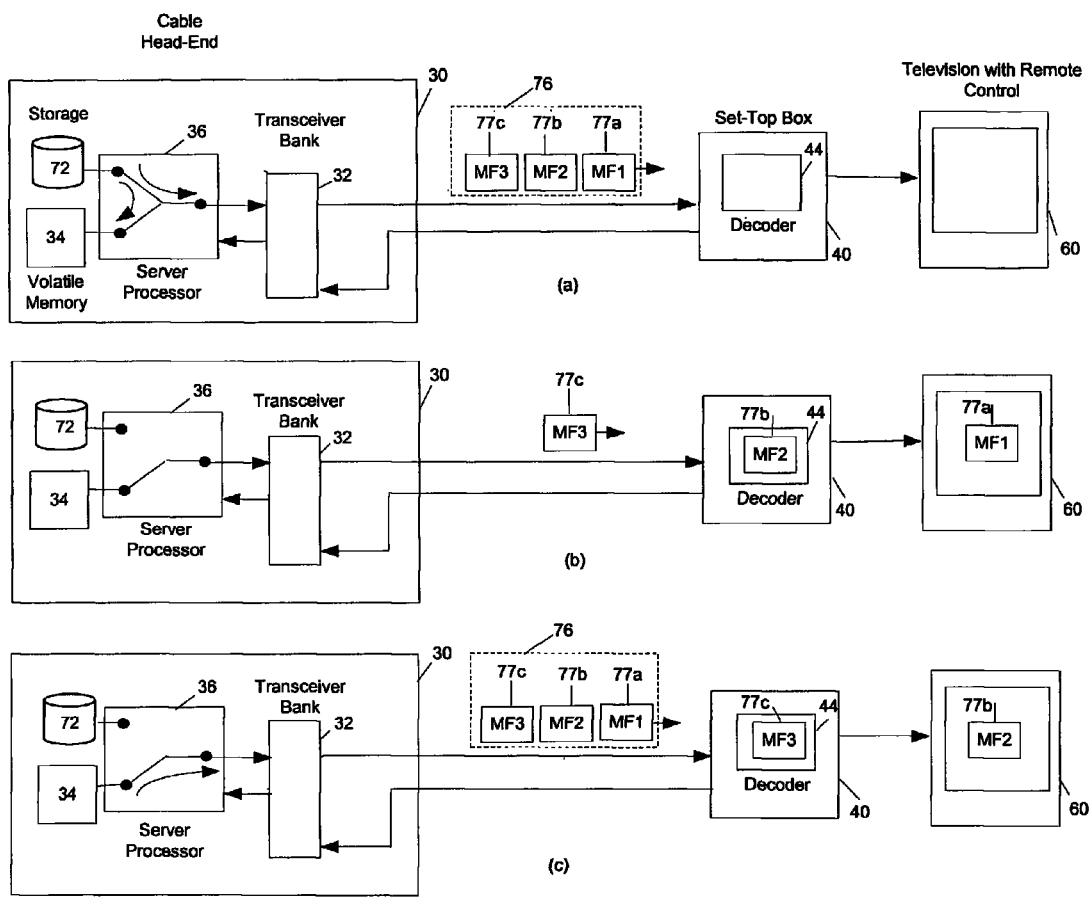
FIGS. 6(a)-(c) is a series of block diagrams representing a cable head end, a set top box, and a television.

Referring to FIGS. 6(a-c), a series of block diagrams are shown that demonstrate the interactions between the cable head end 30 and the set top box 40 in order to repeat the displaying of the content menu 70 (shown in FIG. 5) on the television 60. As shown in FIG. 6(a) when the content menu is retrieved from the content storage 72 by the server processor 36, in response to a viewer request from the set top box 40, a video stream 76 is transmitted from the transceiver 32 to the set top box 40. This video stream 76 includes a SPTS that contains one or more video frames of the content menu 70 for viewing over a period of time. In this particular example, three different video frames (MF1, MF2, MF3) 77a-c represent the video content of the menu 70. In some embodiments the video frames may be the same so a constant picture is displayed, which includes the content menu 70, over a period of time. However, by using different video frames moving images may be displayed along with the content menu 70.

In this particular arrangement, the video stream 76 is included in the particular SPTS that is retrieved, based on the viewer request, from the content storage 72 by the server processor 36 prior to sending the stream to the transceiver 32 for transmission to the requesting set top box 40. As shown in the figure, besides directing the SPTS to the transceiver bank 32, the server processor 36 also directs the SPTS to the volatile storage 34 for use in repeating the transmission of the stream 76 until a viewer selection is received by the set top box 40 and transmitted to the head end 30. Once the video stream 76 is received by the set top box 40, the SPTS is decoded by the decoder 44 and presented on the television 60.

Referring to FIG. 6(b), after the video stream has been received by the set top box 40 and the viewer has not made a selection from the presented menu, a signal is sent from the set top box to the cable head end 30 to alert the server processor 36 that the transmission of the video stream 76 must be repeated until a viewer selection is made. As can be seen on the figure while the "MF1" video frame 77a is being presented on the television and the "MF2" video frame 77b is being decoded by the video decoder 44 of the set top box 40, the final "MF3" video frame of the menu is about to be decoded. In order to continue the appearance of a seamless presentation of the menu on the television 60, the server processor 36 retrieves the video stream 76 from the relatively quick access volatile storage 34 for re-transmission by the transceiver bank 32 to the requesting set top box 40. Referring to FIG. 6(c), this retransmitting of the video stream 76 containing the menu 70 (shown in FIG. 5) may repeat indefinitely until the user enters a menu selection into the set top box 40. Or in some embodiments the repetitions of the video stream 76 sent from the cable head end 30 may be limited to a finite number, which upon completion may cause the transmission may time out and the viewer to be returned to a previous menu or broadcast channel. However, as was shown in FIG. 4, this particular example continues with the viewer selecting to view the movie.

Regarding this particular example, after the viewer has selected the movie from the menu 70 (shown in FIG. 5) options associated with the stored DVD content, a SPTS containing the movie is transmitted to from transceiver 32 at the cable head end 30 to the set top box 40 from which the movie was requested. As the SPTS is received, decoded, and presented to the viewer, commands may be issued from the remote control 18 (not shown), or another similar device, to provide the same capabilities and functionality as the DVD player 10 (shown in FIG. 1). For example, the viewer can issue commands from the remote control 18 to the set top box 40 to pause the movie, fast forward, or rewind to a particular location in the movie, or stop the movie and return to the selection menu 70 associated with the movie as described in conjunction with FIG. 5. In order to perform these functions, the set top box 40 determines that these particular commands are to be executed remotely at the cable head end 30 and correspondingly a signal is sent from the set top box to the cable head end so that the server processor 36 executes commands to perform the DVD-like functions. These commands can be initiated by a button on the remote control being pressed by the viewer, or by commands embedded between cells in the transmitted SPTS. Also, as mentioned, in some arrangements the cable head end 30 can assist the set top box by detecting and performing one or more of the operations based on information embedded in the content of the SPTS. For example, at the end of a particular content element in the SPTS, a command (e.g., virtual machine command) may direct the cable head end 30 to jump to another position of the SPTS, which corresponds to a particular NPT, to continue transmission of another content element included in the SPTS.

Figure 7:
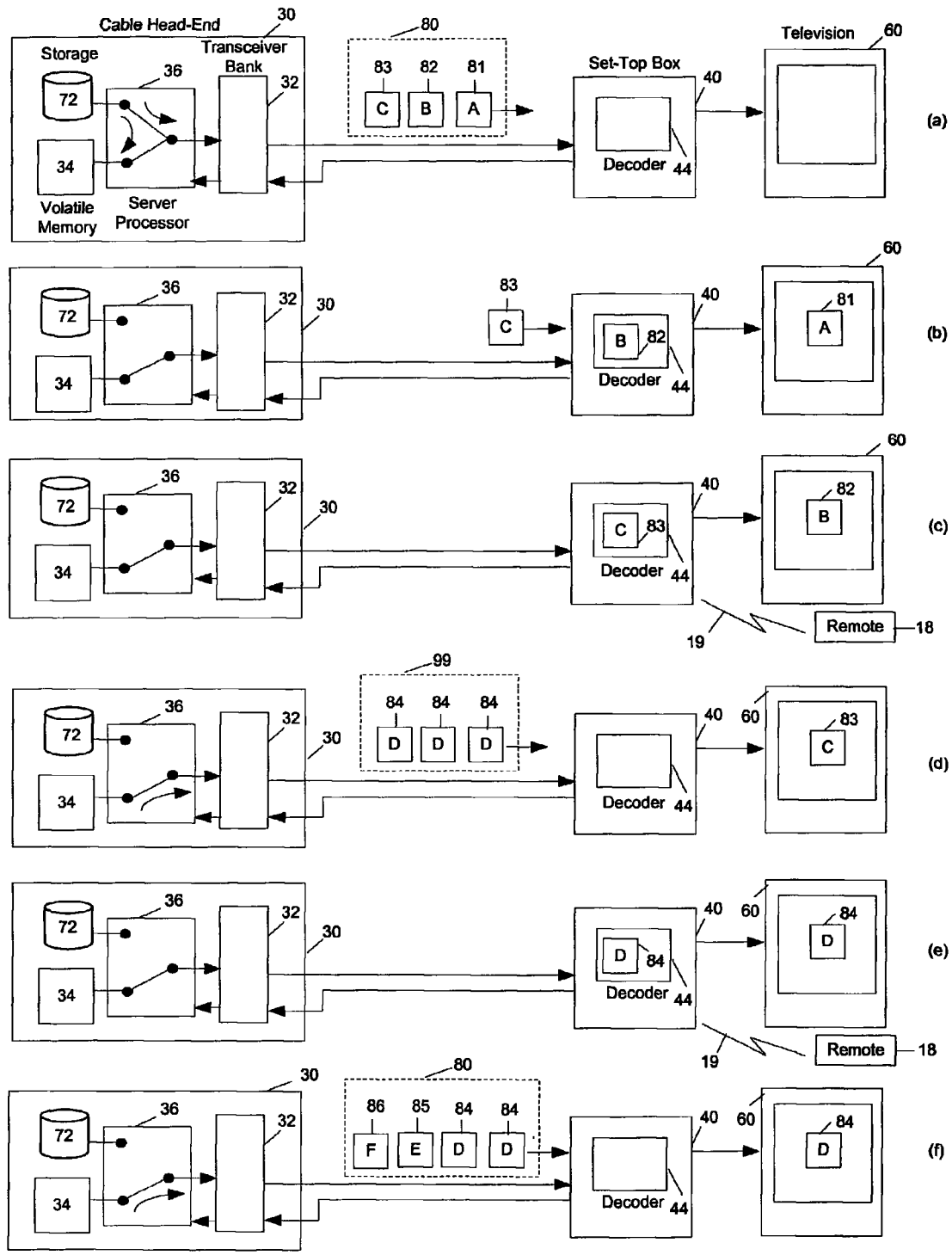
FIGS. 7(a)-(f) is a series of block diagrams representing a cable head end, a set top box, and a television.

Referring to FIGS. 7(a-f) a series of block diagrams are shown to demonstrate the interactions between the set top box 40 and the cable head end 30 for pausing the movie included in a SPTS 80 transmitting from the cable head end to the set top box. Referring to FIG. 7(a), the server processor 36 retrieves from the content storage 72 the SPTS 80 for the respective movie selected by the viewer. As shown in the figure, the initial portion of the movie SPTS 80 is represented as a series of video frames "A" 81, "B" 82, and "C" 83 that are received by the set top box 40 and decoded by the decoder 44 prior to being presented on the television 60 to the viewer. Also, as the SPTS 80 is retrieved from the content storage 72, the server processor 36 also directs the SPTS to the volatile memory 34 so that a copy of the video frames can be quickly accessed for performing DVD-like commands such as pausing the displayed video.

After the video frames transmit from the cable head end 30 to the set top box 40 at the viewing location, each individual video frame 81, 82, 83 (that are know as intraframe or "I" video frames) is decoded and presented in order to the viewer. Referring to FIG. 7(b), while the decoded video frame "A" 81 is presented on the television 60, the video frame "B" 82 is decoded by the decoder 44 and the video frame "C" 83 is in the process of being received by the set-top box 40. Referring to FIG. 7(c), the series of video frames 81, 82, 83 are shown progressing from decoding by the set top box 40 to presenting the individual frames on the television 60. As shown in the figure, the video frame "B" 82 is being presented on the television while the video frame "C" 83 is decoded by the decoder 44. Also, while frame "B" 82 is presented on the television, the viewer has pressed a pause button on the remote control 18 to pause the movie on video frame "B". The set top box 40 receives a wireless signal 19 from the remote control 18 and the set top box determines that the requested pause command cannot be processed locally by the set top box but processed at the cable head end 30. A signal alerting the head end 30 to pause is then sent from the set top box 40 to the head end. The alert signal is received by the transceiver bank 32 of the head end 30 and passed to the server processor 36 so that the volatile storage 34 stops the video frame sequence and only provides a sequence that includes a series of the next video frame to be transmitted upon receiving the alert signal. In this particular example the video frame "D" 84 is repeatedly provided by the volatile memory 32 to the processor 36 and a series of video frames "D" 84 are created and transmitted to the set top box 40 so that the same video frame is presented on the television 60 until the viewer discontinues the video pause.

Referring to FIG. 7(d) a series 99 of video frames "D" 84 created by the server processor 36, are transmitted to the set top box 40 for decoding by the decoder 44 and then presented by the television 60. However, prior to the series 99 of video frames "D" 84 presenting on the television 60, the remaining video frame "C" 83, which was present in and decoded by the decoder 44 from the SPTS 80, is presented on the television 60.

Referring to FIG. 7(e), as the series 99 of video frames "D" 84 are decoded and presented on the television 60, the viewer can re-press the pause button on the remote control 18 to end the pausing and resume the presentation of the selected movie. As described with the initial pressing of the pause button, another signal 19 is wirelessly transmitted to the set top box 40 and the set top box determines that the command embedded in the signal corresponds to a command that is executed remotely at the cable head end 30. The set top box 40 then sends a signal to the cable head end 30 that is received by the transceiver in the transceiver bank 32 that is associated with the set top box 40. The signal is then passed to the server processor 36 that halts any further creating and transmitting of the series 99 of the video frame "D" 84. The server processor 36 also returns to retrieving the movie included in the SPTS 80 from the volatile storage 34 to restart the transmission to the set top box 40 for continuing the presentation of the selected movie. In order to continue the transmission of the selected movie, the server processor 36 retrieves and sends the video frames that correspond to the NPT that follow the particular NPT where the pause initiated. As shown in the figure the video frames now included in the SPTS 80, which are transmitted from the cable head end 30, include both the video frames "D" 84, which complete the pause video frames, and the subsequent video frame "E" 85 and the video frame "F" 86. In some arrangements the transmission will be restarted from the next independent "I" frame that follows that video frame paused on and not be restarted on a forward predicted "P" video frame or a bi-directionally predicted "B" video frame. Also in some arrangements, to pause the video presented, after the alert signal is sent to the cable head end, transmission from the head end can stop all transmission to the requesting set top box 40 and the set top box is capable to continually present the last frame received. The pause function then subsequently ends when a more SPTS content is transmitted from the head end to the set top box. Besides pausing the presentation of a selected movie, the viewer can also initiate other DVD player-type commands such as stepping forward or back frame-by-frame so that the viewer is provided the entire DVD experience.

Figure 8:
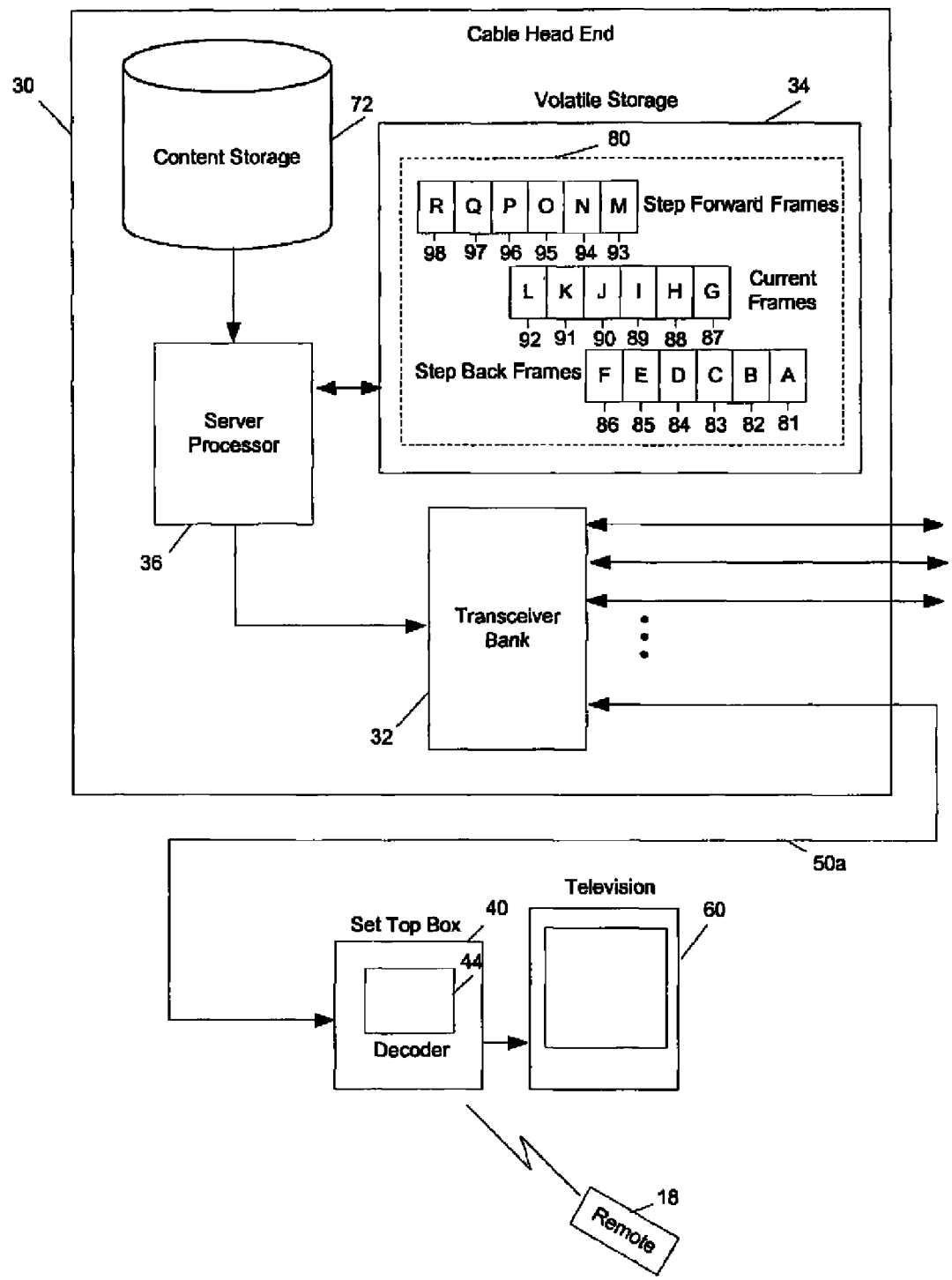
FIG. 8 is a block diagram of a storage drive, a head end server, a set top box, and a television.

Referring to FIG. 8, to provide a viewer with the capability of stepping through individual video frames of a selected movie being presented on the television 60, the volatile storage 34 stores the current video frames 87-92 of the selected movie along with other video frames 81-86 so that the viewer can view previously presented frames on a frame-by-frame basis. The volatile storage 34 also includes video frames 93-98 so the viewer can step through one or more video frames prior to their presentation in the natural progression of the selected movie. All of the video frames 81-98 are included in the movie SPTS 80 that is transmitted from the cable head end 30 to the requesting set top box 40. Also, as mentioned in conjunction with FIG. 7, a copy of the SPTS 80 is placed in the volatile storage 34 after being retrieved from the content storage 72 by the server processor 36. In this particular example, video frames "G" 87, "H" 88, "I" 89, "J" 90, "K" 91, and "L" 92 are labeled by the server processor 36 as the current video frames being decoded and presented on the television 60. The number of frames included in the current video frames is predetermined at the cable head end and may vary depending on the equipment included in the head end 30 along with the decoder used at the viewing location. Video frames "A" 81, "B" 82, "C" 83, "D" 84, "E" 85, and "F" 86, which were previously decoded and presented on the television 60, provide a series of video frames that can be retrieved by the server process 36 for transmission to the set top box 40 so that when a command to step back one or more video frames is entered into the remote control 18, the server processor 36 can quickly access the individual video frames and transmit the particular frames to the set top box 40 for presentation on the television 60. In this particular example, six video frames "A"-"F" 81-86 are shown stored in the volatile storage 34 and may account for only a fraction of one second of the movie. But, in other embodiments more video frames may be stored in the volatile storage 34 to allow the viewer to possibly step back to the beginning frames of the movie SPTS 80.

Along with the 'step back' frames 81-86, the volatile storage 34 also is shown storing the series of video frames 93-98 that provide the capability to the viewer to step forward beyond the currently presented video frames. In this particular example, video frames "M" 93, "N" 94, "O" 95, "P" 96, "Q" 97, and "R" 98 are stored in the volatile storage 34 and follow the natural progression of the 'current' video frame series "G"-"L" 87-92. These particular step forward frames 93-98 are accessed by the server processor 36 when the viewer enters a command from the remote control, which is then sent to the head end 30, to step forward through the video frames beyond the series of current frames being presented on the television 60. Similar to the 'step back' series of video frames 81-86, the 'step forward' series 93-98 also includes a infinite number of frames, which may only contain a fraction of a second of video content, however, the number of frames may be extended to include the end of the movie SPTS 80 so that viewer can step through the entire selected movie.

In order to provide the viewer with the capability to "fast-forward" and "rewind" through a movie that is beginning transmitted from the head end 30, the server processor 36 makes a copy of the SPTS 80 with a number of video frames are dropped. By storing a copy of the SPTS 80 in volatile storage 34 and dropping out a number of the video frames included on the copy, the cable head end can transmit the copy with the reduced video frames to the set top box 40 for presentation at the same rate as the complete movie in the SPTS 80. By presenting this reduced-frame copy at the same rate, the viewer perceives that the movie is being rewound or fast-forwarded depending on which end of the reduced frame copy begins the transmission. Once the viewer halts the fast-forward or rewind command, the time stamp associated with the particular video frame presented is transmitted to the head end 30 so that the SPTS 80 begins re-transmission to the set-top box at the video frame where the rewind or fast-forward command was stopped.

In an alternative embodiment, DVD content 100 (shown in FIG. 2A) is not necessarily provided on DVD media. In some arrangements, an external authoring system can prepare content in a format that is the same or similar to DVD content, or that is prepared from a specification of DVD content. Alternatively authoring system 20 (shown in FIG. 2) supports a content authoring function as well as a conversion function to prepare the content for storage on content storage 72 (also shown in FIG. 2).

In another alternative, the combined functionality of the set top box 40 (shown in FIG. 3) and the cable head end 30 (also shown in FIG. 3) is split so as to perform more of the functions at the set top box or at the cable head end. By splitting the functionality between to the two ends, time intensive content processing can be performed at the end with more processing capability. By splitting the functionality between two ends, activities that would otherwise require high latency communications can be process locally, without the need for any communications. For example, performing looping at the head end 30 instead of having a looping command sent from the set top box 40 reduces communication latency. Other alternative distribution techniques can also be used in distributing the DVD content to subscribers. For example, formats other than MPEG can be used for encoding and transport of the streams. The streams do not have to be transmitted as fixed rate streams. Furthermore, although the format conversion of DVD content is described as being performed prior to a request from a viewer, such conversions can alternatively be performed on demand. Also, rather than maintaining a single centralized instance of the content, multiple instances may be maintained, for instance, for load balancing or caching at multiple locations.

In another alternative, DVD content is not necessarily delivered over a cable television system. For example, streaming content is passed over a data network to a client, for example, for presenting streaming multimedia content. Also in another alternative, the streaming content is passed over a two-way internet protocol (e.g., DSL) to the client. Also, streaming content can be passed over one or more wireless networks that incorporate one or a combination of radio frequency (RF), infrared (IR), or visual technology to present streaming multimedia content.

The video content stored on the particular DVD disk 12 (shown in FIG. 2) may discontinue for periods of time while the associated audio content on the disk continues uninterrupted during this gap in video content. In some arrangements, the authoring system 20 (also shown in FIG. 2) replaces these video gaps with video content (e.g., insert "P" frames) such that the last video image prior to a particular gap is duplicated in the gap. Also, at the end of a stream of video content or at a particular point in streaming video, the streaming content may jump to a different location of the content (or the back to a previous location to loop the video content) prior to resuming the content streaming. A time delay can incur due to the processing to perform the jump. To continue video streaming during this delay, the video content prior to the jump is padded with duplicate video frames (e.g., "P" frames) of the last image so that this image is repeated until the jump is made and content is again ready for streaming.

In another alternative, the multiplexed MPEG-2 single program transport stream (SPTS) 126 (shown in FIG. 2B) is stored locally at the viewer's location in a fashion similar to storing in the content storage 72 at the cable head end 30 (shown in FIG. 3). The SPTS is transmitted to the viewer's location by hardwire (e.g. cable) or by wireless techniques (e.g., radio frequency, IR, satellite telemetry, etc.) and is stored for use with a personal video recorder (PVR) or other similar recorder. The PVR provides the functionality for accessing and decoding the SPTS along with the ability to process viewer entered commands for controlling what content is presented. Control data encoded in the SPTS that controls presenting of the SPTS content without viewer interactions, is detected and processed by a controller associated with the PVR prior to presenting SPTS content on a television. The controller also processes control data that does relate to viewer interactions to provide the viewer with the "DVD" experience at home.

A number of embodiments of the invention have been described. Nevertheless, it will be understood that various modifications may be made without departing from the spirit and scope of the invention. Accordingly, other embodiments are within the scope of the following claims.

What is claimed is:

1. A computerized method for storage and delivery of interactive multimedia content, the method comprising:

retrieving audio/video data, menu data and navigation data from an interactive storage disk, the audio/video data including at least a first Video Object (VOB) assigned according to a first time stamp series, the navigation data identifying one or more sectors on the interactive storage disk where the retrieved audio/video data is stored, the menu data including at least a second Video Object (VOB) assigned according to a second time stamp series independent of the first time stamp series, the menu data defining a graphical interactive menu comprising one or more menu selections associated with the one or more sectors;

producing, based on the audio/video data, at least a first audio elementary stream and at least a first video elementary stream, the first audio elementary stream comprising audio segments and the first video elementary stream comprising video segments;

producing, based on the menu data and navigation data, a control data elementary stream comprising at least a first control data segment, the first control data segment including at least a first graphical menu selection associated with a first audio segment from the audio segments and a first video segment from the video segments;

combining the first audio elementary stream, the first video elementary stream and the control data elementary stream to form a multiplexed data stream;

assigning a common time stamp series to the first control data segment, the audio segments and the video segments in the multiplexed data stream, the common time stamp series including at least a first selection time stamp and a second selection time stamp different from the first selection time stamp, the first selection time stamp assigned to the first audio segment and the first video segment, the second selection time stamp assigned to the first control data segment;

setting the first control data segment to associate the first graphical menu selection with the first selection time stamp;

transmitting, to a terminal over a data network, the first control data segment;

receiving, from the terminal, a request for the first selection time stamp based on a user selection of the first graphical menu selection; and transmitting, to the terminal, the first audio segment and the first video segment in response to the request.

2. The method of claim 1, wherein the first control data segment includes at least a second graphical menu selection associated with a second audio segment from the audio segments and a second video segment from the video segments, the common time stamp series further including at least a second selection time stamp associated with the second audio segment and the second video segment, the method further comprising:

setting the first control data segment to associate the second graphical menu selection with the second selection time stamp;

receiving, from the terminal, a second request for the second selection time stamp based on a user selection of the second graphical menu selection; and transmitting, to the terminal, the second audio segment and the second video segment in response to the second request.

3. The method of claim 2, wherein first audio and video segments are the beginning of a movie and the second audio and video segments are the beginning of an alternate ending to the movie, a preview of the movie, or a documentary of the movie.

4. The method of claim 1, wherein the control data elementary stream includes at least a second control data segment, the second control data segment including a second graphical menu selection associated with a second audio segment from the audio segments and a second video segment from the video segments, the common time stamp series further including at least a second selection time stamp associated with the second audio segment and the second video segment, the method further comprising:

setting the second control data segment to associate the second graphical menu selection with the second selection time stamp;

transmitting, to the terminal, the second control data segment;

receiving, from the terminal, a second request for the second selection time stamp based on a user selection of the second graphical menu selection; and transmitting, to the terminal, the second audio segment and the second video segment in response to the second request.

5. The method of claim 1 further comprising receiving, from one or more other terminals different from the terminal, one or more other requests for the first selection time stamp based on user selections of the first graphical menu selection.

6. The method of claim 1 wherein the interactive storage disk comprises a digital versatile disk (DVD).

7. The method of claim 1 wherein the multiplexed data stream includes an MPEG stream.

8. The method of claim 7 wherein the MPEG stream includes an MPEG transport stream.

9. The method of claim 8 wherein the MPEG stream is formed as one continuous single program transport stream.

10. The method of claim 1 wherein producing the first audio elementary stream and the first video elementary stream comprises converting the format of the audio/video data.

11. The method of claim 10 wherein converting the format of the audio/video data includes converting the format of video information.

12. The method of claim 11 wherein the format of video information comprises pixel resolution.

13. The method of claim 10 wherein converting the format of the audio/video data includes converting the format of audio information.

14. The method of claim 13 wherein the format of audio information comprises audio bandwidth or encoding format.

15. The method of claim 1 wherein at least some of the audio segments and some of the video segments include repeated content.

16. The method of claim 1 wherein the common time stamp series increments continuously over the multiplexed data stream.

17. The method of claim 1 wherein assigning the common time stamp series to the first control data segment, the audio segments and the video segments in the multiplexed data stream comprises assigning a time stamp to each of the control data segment, the audio segments and the video segments.

18. The method of claim 17 wherein each time stamp assigned to the video segments is different.

19. The method of claim 1 wherein the first graphical menu selection includes a video background.

20. The method of claim 1 wherein the first control data segment further includes instructions for a terminal to display the first graphical menu selection.

21. The method of claim 1 further comprising storing the multiplexed data stream in a content storage device prior to receiving the request for the first selection time stamp.

22. The method of claim 21 wherein the content storage device is remote from the terminal.

23. The method of claim 2 wherein the terminal is located at a viewer's location.

24. The method of claim 22 wherein the content storage device is located at a head end of a television system.

25. The method of claim 1 wherein the terminal comprises a television set-top box.

26. The method of claim 1 the first control data segment is located before the video segments and the audio segments in the multiplexed data stream.

27. The method of claim 1 further comprising:

receiving, from the terminal, a command instruction, the command instruction including a pause instruction, a fast forward instruction, or a rewind instruction; and transmitting, to the terminal, one or more video segments from the video segments in response to the command instruction.

28. The method of claim 1 further comprising:

producing, based on the audio/video data, at least a second audio elementary stream and at least a second video elementary stream, the first audio elementary stream comprising audio segments different from the audio segments in the second audio elementary stream and the first video elementary stream comprising video segments different from the video segments in the first video elementary stream;

combining the second audio elementary stream, the second video elementary stream and the control data elementary stream to form a second multiplexed data stream; and assigning a second common time stamp series to the first control data segment, the audio segments and the video segments in the second multiplexed data stream.

29. A computer program product, tangibly embodied in a computer readable storage device, for storage and delivery of interactive multimedia content, including instructions being operable to cause data processing apparatus to:

retrieve audio/video data, menu data and navigation data from an interactive storage disk, the audio/video data including at least a first Video Object (VOB) assigned according to a first time stamp series, the navigation data identifying one or more sectors on the interactive storage disk where the retrieved audio/video data is stored, the menu data including at least a second Video Object (VOB) assigned according to a second time stamp series independent of the first time stamp series, the menu data defining a graphical interactive menu comprising one or more menu selections associated with the one or more sectors;

produce, based on the audio/video data, at least a first audio elementary stream and at least a first video elementary stream, the first audio elementary stream comprising audio segments and the first video elementary stream comprising video segments;

produce, based on the menu data and navigation data, a control data elementary stream comprising at least a first control data segment, the first control data segment including at least a first graphical menu selection associated with a first audio segment from the audio segments and a first video segment from the video segments;

combine the first audio elementary stream, the first video elementary stream and the control data elementary stream to form a multiplexed data stream;

assign a common time stamp series to the first control data segment, the audio segments and the video segments in the multiplexed data stream, the common time stamp series including at least a first selection time stamp and a second selection time stamp different from the first selection time stamp, the first selection time stamp assigned to the first audio segment and the first video segment, the second selection time stamp assigned to the first control data segment;

set the first control data segment to associate the first graphical menu selection with the first selection time stamp;

transmit, to a terminal over a data network, the first control data segment;

receive, from the terminal, a request for the first selection time stamp based on a user selection of the first graphical menu selection; and transmit, to the terminal, the first audio segment and the first video segment in response to the request.

* * * * *

UNITED STATES PATENT AND TRADEMARK OFFICE
CERTIFICATE OF CORRECTION

| | | |
|---|---|---|
| PATENT NO. | : 8,015,584 B2 | Page 1 of 1 |
| APPLICATION NO. | : 10/273527 | |
| DATED | : September 6, 2011 | |
| INVENTOR(S) | : George Edward Breen et al. | |

It is certified that error appears in the above-identified patent and that said Letters Patent is hereby corrected as shown below:

In claim 23, at column 19, line 66, delete "2" and insert --22--

Signed and Sealed this
Twenty-fifth Day of October, 2011

David J. Kappos
*Director of the United States Patent and Trademark Office*